(12) United States Patent
Knopf et al.

(10) Patent No.: US 12,381,741 B2
(45) Date of Patent: *Aug. 5, 2025

(54) SYSTEMS AND METHODS FOR VERIFYING A ROUTE TAKEN BY A COMMUNICATION

(71) Applicant: Neustar, Inc., Reston, VA (US)

(72) Inventors: Brian R. Knopf, Woodland Hills, CA (US); Mark Watson, San Francisco, CA (US)

(73) Assignee: Neustar, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,828

(22) Filed: Oct. 31, 2023

(65) Prior Publication Data

US 2024/0146538 A1    May 2, 2024

Related U.S. Application Data

(63) Continuation of application No. 17/460,837, filed on Aug. 30, 2021, now Pat. No. 11,804,967, which is a
(Continued)

(51) Int. Cl.
*H04L 9/32* (2006.01)
*H04L 9/08* (2006.01)
(Continued)

(52) U.S. Cl.
CPC ............ *H04L 9/3247* (2013.01); *H04L 9/088* (2013.01); *H04L 9/14* (2013.01); *H04L 9/321* (2013.01);
(Continued)

(58) Field of Classification Search
CPC ....... H04L 9/3247; H04L 9/14; H04L 63/123; H04L 63/126
See application file for complete search history.

(56) References Cited

U.S. PATENT DOCUMENTS 5,455,865 A    10/1995 Perlman
5,715,314 A    2/1998 Payne et al.
(Continued)

FOREIGN PATENT DOCUMENTS

EP          0683582 A1    11/1995
KR    20130083619 A     7/2013

OTHER PUBLICATIONS

Siriwardena P, Siriwardena P. JWT, JWS, and JWE. Advanced API Security: Securing APIs with OAuth 2.0, OpenID Connect, JWS, and JWE. 2014:201-20. (Year: 2014).*
(Continued)

*Primary Examiner* — Robert B Leung
(74) *Attorney, Agent, or Firm* — STERNE, KESSLER, GOLDSTEIN & FOX P.L.L.C.

(57) ABSTRACT

Computer systems and methods for verifying a route taken by a communication are disclosed. In one implementation, a device for verifying a route taken by a communication may include one or more processors configured to obtain a communication transmitted by a source entity. The communication may include data and digital signatures, and each of the digital signatures may be generated based on at least the data. Further, the digital signatures may include a digital signature associated with the source entity, and a set of digital signatures associated with at least a subset of intermediate entities on a route taken by the communication. The one or more processors may be further configured to verify the digital signatures included in the communication, verify whether the entities associated with the digital signatures form an expected route for the communication, and process the data.

19 Claims, 8 Drawing Sheets

Related U.S. Application Data continuation of application No. 15/652,114, filed on Jul. 17, 2017, now Pat. No. 11,108,562, which is a continuation-in-part of application No. 15/588,533, filed on May 5, 2017, now Pat. No. 10,404,472.

(60) Provisional application No. 62/469,346, filed on Mar. 9, 2017, provisional application No. 62/332,271, filed on May 5, 2016.

(51) Int. Cl.
*H04L 9/14* (2006.01)
*H04L 9/40* (2022.01)

(52) U.S. Cl.
CPC .......... *H04L 63/062* (2013.01); *H04L 63/123* (2013.01); *H04L 63/126* (2013.01)

(56) References Cited

U.S. PATENT DOCUMENTS

| | | |
|---|---|---|
| 6,209,091 B1 | 3/2001 | Sudia et al. |
| 6,263,446 B1 | 7/2001 | Kausik et al. |
| 6,381,331 B1 | 4/2002 | Kato |
| 6,801,534 B1 | 10/2004 | Arrowood et al. |
| 6,826,690 B1 | 11/2004 | Hind et al. |
| 6,850,951 B1 | 2/2005 | Davison |
| 7,266,695 B2 | 9/2007 | Nakayama |
| 7,320,073 B2 | 1/2008 | Zissimopoulos et al. |
| 7,428,750 B1 | 9/2008 | Dunn et al. |
| 7,522,723 B1 | 4/2009 | Shaik |
| 8,023,647 B2 | 9/2011 | Shaik |
| 8,229,484 B2 | 7/2012 | Anisimov |
| 8,561,187 B1 | 10/2013 | Hegil |
| 8,578,468 B1 | 11/2013 | Yadav |
| 8,726,379 B1 | 5/2014 | Stiansen |
| 8,769,304 B2 | 7/2014 | Kirsch |
| 8,819,825 B2 | 8/2014 | Keromytis et al. |
| 9,027,135 B1 | 5/2015 | Aziz |
| 9,094,811 B1 | 7/2015 | Rosen |
| 9,177,005 B2 | 11/2015 | Mehta et al. |
| 9,197,673 B1 | 11/2015 | Gaddy et al. |
| 9,203,819 B2 | 12/2015 | Fenton et al. |
| 9,215,223 B2 | 12/2015 | Kirsch |
| 9,344,413 B2 | 5/2016 | Kirsch |
| 9,356,942 B1 | 5/2016 | Joffe |
| 9,418,222 B1 | 8/2016 | Rivera et al. |
| 9,485,231 B1 | 11/2016 | Reese |
| 9,521,240 B1 | 12/2016 | Rosen |
| 9,674,222 B1 | 6/2017 | Joffe |
| 9,832,217 B2 | 11/2017 | Berger et al. |
| 10,244,107 B1 | 3/2019 | Sena |
| 10,404,472 B2 | 9/2019 | Knopf |
| 11,108,562 B2 | 8/2021 | Knopf et al. |
| 2001/0024502 A1 | 9/2001 | Ohkuma et al. |
| 2002/0076055 A1 | 6/2002 | Filipi-Martin et al. |
| 2002/0194163 A1 | 12/2002 | Hopeman et al. |
| 2003/0065947 A1 | 4/2003 | Song |
| 2003/0110397 A1 | 6/2003 | Supramaniam et al. |
| 2003/0147534 A1 | 8/2003 | Ablay et al. |
| 2003/0177400 A1 | 9/2003 | Raley et al. |
| 2003/0204511 A1 | 10/2003 | Brundage et al. |
| 2004/0062400 A1 | 4/2004 | Sovio et al. |
| 2004/0088587 A1 | 5/2004 | Ramaswamy et al. |
| 2004/0172557 A1 | 9/2004 | Nakae et al. |
| 2004/0176123 A1 | 9/2004 | Chin et al. |
| 2004/0205342 A1 | 10/2004 | Roegner |
| 2005/0010447 A1 | 1/2005 | Miyasaka et al. |
| 2005/0036616 A1* | 2/2005 | Huang .................. H04L 9/3247 380/255 |
| 2005/0044402 A1 | 2/2005 | Libin et al. |
| 2005/0054380 A1 | 3/2005 | Michaelis |
| 2005/0097320 A1 | 5/2005 | Golan et al. |
| 2005/0132060 A1 | 6/2005 | Mo et al. |
| 2005/0220080 A1 | 10/2005 | Ronkainen |
| 2005/0220095 A1 | 10/2005 | Narayanan et al. |
| 2006/0059357 A1† | 3/2006 | Miyazaki |
| 2006/0059551 A1 | 3/2006 | Borella |
| 2006/0080534 A1 | 4/2006 | Yeap et al. |
| 2006/0083187 A1 | 4/2006 | Dekel |
| 2006/0090166 A1 | 4/2006 | Dhara et al. |
| 2006/0101516 A1 | 5/2006 | Sudaharan |
| 2006/0129817 A1 | 6/2006 | Borneman et al. |
| 2006/0131385 A1 | 6/2006 | Kim |
| 2006/0206709 A1 | 9/2006 | Labrou et al. |
| 2006/0224508 A1 | 10/2006 | Fietz |
| 2006/0236095 A1 | 10/2006 | Smith |
| 2007/0061263 A1 | 3/2007 | Carter et al. |
| 2007/0198437 A1 | 8/2007 | Eisner et al. |
| 2007/0228148 A1 | 10/2007 | Rable |
| 2008/0016232 A1 | 1/2008 | Yared et al. |
| 2008/0028453 A1 | 1/2008 | Nguyen et al. |
| 2008/0028463 A1 | 1/2008 | Dagon |
| 2008/0046987 A1 | 2/2008 | Spector |
| 2008/0089520 A1 | 4/2008 | Kessler |
| 2008/0141313 A1 | 6/2008 | Kato et al. |
| 2008/0163354 A1 | 7/2008 | Ben-Shalom et al. |
| 2008/0189778 A1 | 8/2008 | Rowley |
| 2008/0222711 A1 | 9/2008 | Michaelis |
| 2008/0244739 A1* | 10/2008 | Liu .................. H04L 63/1466 726/22 |
| 2008/0250248 A1 | 10/2008 | Lieber |
| 2009/0037994 A1 | 2/2009 | Buss et al. |
| 2009/0080408 A1 | 3/2009 | Natoli et al. |
| 2009/0089625 A1 | 4/2009 | Kannappan et al. |
| 2009/0119778 A1 | 5/2009 | Bhuyan |
| 2009/0157799 A1 | 6/2009 | Sukumaran et al. |
| 2009/0249014 A1 | 10/2009 | Obereiner |
| 2009/0249497 A1 | 10/2009 | Fitzgerald |
| 2009/0260064 A1 | 10/2009 | McDowell |
| 2010/0003959 A1 | 1/2010 | Coppage |
| 2010/0077457 A1 | 3/2010 | Xu et al. |
| 2010/0100945 A1 | 4/2010 | Ozzie et al. |
| 2010/0100950 A1 | 4/2010 | Roberts |
| 2010/0161969 A1 | 6/2010 | Grebovich et al. |
| 2010/0162396 A1 | 6/2010 | Liu |
| 2010/0174439 A1 | 7/2010 | Petricoin, Jr. et al. |
| 2010/0182283 A1 | 7/2010 | Sip |
| 2010/0185869 A1 | 7/2010 | Moore et al. |
| 2010/0210240 A1 | 8/2010 | Mahaffey et al. |
| 2010/0260337 A1* | 10/2010 | Song .................. H04W 12/04 380/259 |
| 2010/0275009 A1 | 10/2010 | Canard et al. |
| 2010/0306107 A1 | 12/2010 | Nahari |
| 2010/0316217 A1 | 12/2010 | Gammel et al. |
| 2010/0325685 A1 | 12/2010 | Sanbower |
| 2011/0009086 A1 | 1/2011 | Poremba et al. |
| 2011/0067095 A1 | 3/2011 | Leicher et al. |
| 2011/0078439 A1 | 3/2011 | Mao et al. |
| 2011/0103393 A1 | 5/2011 | Meier et al. |
| 2011/0167494 A1 | 7/2011 | Bowen et al. |
| 2011/0179475 A1 | 7/2011 | Foell et al. |
| 2011/0222466 A1 | 9/2011 | Pance |
| 2011/0246765 A1 | 10/2011 | Schibuk |
| 2011/0252459 A1 | 10/2011 | Walsh |
| 2011/0282997 A1 | 11/2011 | Prince |
| 2012/0042381 A1 | 2/2012 | Antonakakis |
| 2012/0050455 A1 | 3/2012 | Santamaria et al. |
| 2012/0124379 A1 | 5/2012 | Teranishi |
| 2012/0155637 A1 | 6/2012 | Lambert et al. |
| 2012/0158725 A1 | 6/2012 | Molloy et al. |
| 2012/0197911 A1 | 8/2012 | Banka et al. |
| 2012/0233685 A1 | 9/2012 | Palanigounder et al. |
| 2012/0265631 A1 | 10/2012 | Cronic et al. |
| 2012/0320912 A1 | 12/2012 | Estrada |
| 2012/0324076 A1 | 12/2012 | Zerr et al. |
| 2012/0324242 A1 | 12/2012 | Kirsch |
| 2012/0331296 A1 | 12/2012 | Levin et al. |
| 2013/0133072 A1 | 5/2013 | Kraitsman et al. |
| 2013/0198078 A1 | 8/2013 | Kirsch |
| 2013/0198516 A1 | 8/2013 | Fenton et al. |
| 2013/0198598 A1 | 8/2013 | Kirsch |
| 2013/0198834 A1 | 8/2013 | Kirsch |
| 2013/0205136 A1 | 8/2013 | Kirsch |

(56) References Cited

U.S. PATENT DOCUMENTS

| | | | |
|---|---|---|---|
| 2013/0239169 A1* | 9/2013 | Nakhjiri | H04L 63/20 |
| | | | 726/1 |
| 2013/0246272 A1 | 9/2013 | Kirsch | |
| 2013/0246280 A1 | 9/2013 | Kirsch | |
| 2014/0198791 A1* | 7/2014 | Lim | H04L 63/123 |
| | | | 370/392 |
| 2014/0214902 A1 | 7/2014 | Mehta et al. | |
| 2014/0344904 A1 | 11/2014 | Venkataramani et al. | |
| 2014/0351596 A1 | 11/2014 | Chan | |
| 2015/0033024 A1† | 1/2015 | Mashima | |
| 2015/0047032 A1 | 2/2015 | Hannis et al. | |
| 2015/0088754 A1 | 3/2015 | Kirsch | |
| 2015/0321557 A1 | 11/2015 | Kim et al. | |
| 2015/0326588 A1 | 11/2015 | Vissamsetty | |
| 2016/0094531 A1* | 3/2016 | Unnikrishnan | H04L 63/08 |
| | | | 726/7 |
| 2016/0173505 A1 | 6/2016 | Ichihara | |
| 2016/0197932 A1 | 7/2016 | Hoffman et al. | |
| 2016/0241509 A1 | 8/2016 | Akcin | |
| 2016/0261413 A1 | 9/2016 | Kirsch | |
| 2016/0300223 A1† | 10/2016 | Grey | |
| 2017/0324564 A1 | 11/2017 | Knopf | |
| 2017/0366575 A1 | 12/2017 | Polepalli et al. | |
| 2018/0013569 A1 | 1/2018 | Knopf | |
| 2018/0013786 A1 | 1/2018 | Knopf | |
| 2018/0013824 A1 | 1/2018 | Knopf | |
| 2018/0183603 A1 | 6/2018 | Liu et al. | |
| 2019/0124199 A1 | 4/2019 | Sena | |

OTHER PUBLICATIONS

Abe, Tsuyoshi et al., "Implementing Identity Provider on Mobile Phone," 2007, ACM, pp. 46-52.

Balasubramaniam, Sriram et al., "Identity Management and its Impact on Federation in a System-of-Systems Context," Mar. 23-26, 2009, IEEE, pp. 179-182.

Beasley, Jim et al., "Virtual Bluetooth Devices as a Means of Extending Pairing and Bonding in a Bluetooth Network," 2002, IEEE, vol. 4, pp. 2087-2089.

Chen, Liqun et al., Multiple Trusted Authorities in Identified Based Cryptography from Pairings on Elliptic Curves, Mar. 19, 2003, HP, pp. 1-26.

International Search Report and Written Opinion of PCT/US2012/042743 mailed on Sep. 18, 2012, 10 pages.

International Search Report and Written Opinion of PCT/US2013/022207 mailed on Mar. 29, 2013, 11 pages.

International Search Report and Written Opinion of PCT/US2017/31438 mailed Jul. 25, 2017, 8 pages.

International Search Report and Written Opinion of PCT/US2018/21877 mailed on May 30, 2018, 8 pages.

International Search Report and Written Opinion of PCT/US2018/42524 mailed Oct. 30, 2018, 8 pages.

International Search Report and Written Opinion of PCT/US2018/42508 mailed Dec. 13, 2018, 8 pages.

Jansen, Wayne et al., "Guidelines on Cell Phone and PDA Security," Oct. 2008, NIST, pp. 1-52.

Kholmatov, Alisher et al., "Identity Authentication Using Improved Online Signature Verification Method," Nov. 2005, ScienceDirect, vol. 26, Issue 15, pp. 2400-2408.

Masmoudi, Khaled et al., "Building Identity-Based Security Associations for Provider-Provisioned Virtual Private Networks," Dec. 2008, Springer, vol. 39, Issue 3, pp. 215-222.

Mayrhofer, Rene et al., "Shake Well Before Use: Intuitive and Secure Pairing of Mobile Devices," Feb. 27, 2009, IEEE, vol. 8, Issue 6, pp. 792-806.

Nguyen, Lan et al., "Secure Authorization, Access Control and Data Integrity in Bluetooth," 2002, IEEE, pp. 428-433.

Novotny, Jason et al., "An Online Credential Repository for the Grid: MyProxy," 2001, IEEE, pp. 104-111.

Poggi, Nicolas et al., "Automatic Detection and Banning of Content Stealing Bots for E-Commerce," NIPS 2007 Workshop on Machine Learning in Adversarial Environments for Computer Security, 2 pages, Dec. 8, 2007.

So-In, Chakchai et al., "Virtual ID: A Technique for Mobility, MultiHoming, and Location Privacy in Next Generation Wireless Networks," Jan. 9-12, 2010, IEEE, pp. 1-5.

Squicciarini, Anna Cinzia et al., "Access Control Strategies for Virtualized Environments in Grid Computing Systems," Mar. 21-23, 2007, IEEE, pp. 48-54.

Tangswongsan, Supachai et al., "A Model of Network Security with Prevention Capability by Using Decoy Technique," World Academy of Science, Engineering and Technology 29, pp. 184-189, 2007.

Heer, Tobias, et al., "ALPHA: an adaptive and lightweight protocol for hop-by-hop authentication." Proceedings of the 2008 ACM CoNEXT Conference. ACM, 2008.

Lu, Bin, and Udo W. Pooch, "A lightweight authentication protocol for mobile ad hoc networks," International Conference on Information Technology: Coding and Computing (ITCC'05)—vol. II, vol. 2, IEEE, 2005.

Sanzgiri, Kimaya, et al., "A secure routing protocol for ad hoc networks," 10th IEEE International Conference on Network Protocols, 2002, Proceedings, IEEE, 2002.

Request for Comments: 7159. The JavaScript Object Notation (JSON) Data Interchange Format, Mar. 2014.

Crockford D. Json, ECMA International, 2012, Retrieved from http://www.json.org/json.pdf on Apr. 19, 2021.

\* cited by examiner
† cited by third party

```
{
  "payload": <data>,
  "signatures": [
    {
      "protected": {
        "sidx": 0,
        ...
      },
      "signature": <signature 0 data>
    },
    {
      "protected": {
        "sidx": 1,
        ...
      },
      "signature": <signature 1 data>
    },
    ...
  ]
}
```

SYSTEMS AND METHODS FOR VERIFYING A ROUTE TAKEN BY A COMMUNICATION

CROSS-REFERENCE TO RELATED APPLICATION(S)

This application is a continuation of U.S. application Ser. No. 17/460,837, filed on Aug. 30, 2021, titled "SYSTEMS AND METHODS FOR VERIFYING A ROUTE TAKEN BY A COMMUNICATION", which is a continuation of U.S. application Ser. No. 15/652,114, filed on Jul. 17, 2017, titled "SYSTEMS AND METHODS FOR VERIFYING A ROUTE TAKEN BY A COMMUNICATION," which is a continuation-in-part of U.S. application Ser. No. 15/588,533, filed on May 5, 2017, titled "SYSTEMS AND METHODS FOR ENABLING TRUSTED COMMUNICATIONS BETWEEN ENTITIES," which claims priority to U.S. Provisional Application No. 62/332,271, filed on May 5, 2016, titled "DEVICE AUTHENTICATION USING A CENTRAL REPOSITORY." The '533 application also claims priority to U.S. Provisional Application No. 62/469,346, filed on Mar. 9, 2017, titled "METHODS AND SYSTEMS FOR IDENTITY MANAGEMENT." Further, this application is related to U.S. application Ser. No. 15/652,098, titled "SYSTEMS AND METHODS FOR ENABLING TRUSTED COMMUNICATIONS BETWEEN CONTROLLERS," U.S. application Ser. No. 15/652,108, titled "SYSTEMS AND METHODS FOR MITIGATING AND/OR PREVENTING DISTRIBUTED DENIAL-OF-SERVICE ATTACKS," and U.S. application Ser. No. 15/652,089, titled "SYSTEMS AND METHODS FOR DISTRIBUTING PARTIAL DATA TO SUBNETWORKS," where these three related applications were filed on Jul. 17, 2017. The disclosures of all of the above applications are hereby incorporated by reference in their entirety for all purposes.

TECHNICAL FIELD

The present disclosure relates to computer systems and methods for verifying a route taken by a communication. More particularly, the present disclosure relates to computer systems and methods for verifying identities of the entities on a route taken by a communication.

BACKGROUND

Public-key infrastructure (PKI) enables secure transfer of information between entities without using usernames, passwords, or shared secrets. However, a PKI deployment requires certificate authorities (CAs) and validation authorities (VAs), which are single points of failure. Therefore, if a CA or VA becomes disabled or compromised, every entity that relies on the CA or the VA may become more vulnerable to attacks, such as spoofing.

SUMMARY

In one embodiment, a device for verifying a route taken by a communication may include one or more processors configured to obtain a communication transmitted by a source entity. The communication may include data and digital signatures, and each of the digital signatures may be generated based on at least the data. Further, the digital signatures may include a digital signature associated with the source entity, and a set of digital signatures associated with at least a subset of intermediate entities on a route taken by the communication. The one or more processors may be further configured to verify the digital signatures included in the communication, verify whether the entities associated with the digital signatures form an expected route for the communication, and process the data.

In another embodiment, a method for verifying a route taken by a communication may include obtaining a communication transmitted by a source entity. The communication may include data and digital signatures, and each of the digital signatures may be generated based on at least the data. Further, the digital signatures may include a digital signature associated with the source entity, and a set of digital signatures associated with at least a subset of intermediate entities on a route taken by the communication. The method may further include verifying the digital signatures included in the communication, verifying whether the entities associated with the digital signatures form an expected route for the communication, and processing the data.

In yet another embodiments, a non-transitory computer-readable storage medium storing instructions that when executed by a computer cause the computer to perform a method for verifying a route taken by a communication includes obtaining a communication transmitted by a source entity. The communication may include data and digital signatures, and each of the digital signatures may be generated based on at least the data. Further, the digital signatures may include a digital signature associated with the source entity, and a set of digital signatures associated with at least a subset of intermediate entities on a route taken by the communication. The method may further include verifying the digital signatures included in the communication, verifying whether the entities associated with the digital signatures form an expected route for the communication, and processing the data.

BRIEF DESCRIPTION OF THE DRAWINGS

FIG. 8 illustrates an example data structure for the communication of the communication system in accordance with the disclosed embodiments.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Aspects of the disclosure pertains to computer systems and methods for verifying a route taken by a communication. More particularly, the present disclosure relates to computer systems and methods for verifying identities of the entities on a route taken by a communication. Further, the disclosed systems and methods may be capable of verifying that the route taken by the communication includes an expected set of entities in an expected order. The disclosed systems and methods may process data in the communication after verifying the identities of the entities on a route taken by a communication and/or verifying that the route taken by the communication includes the expected set of entities in the expected order. There are several potential applications for this technology, and the scope of this disclosure is not intended to be limited to any particular business concern.

Figure 1:
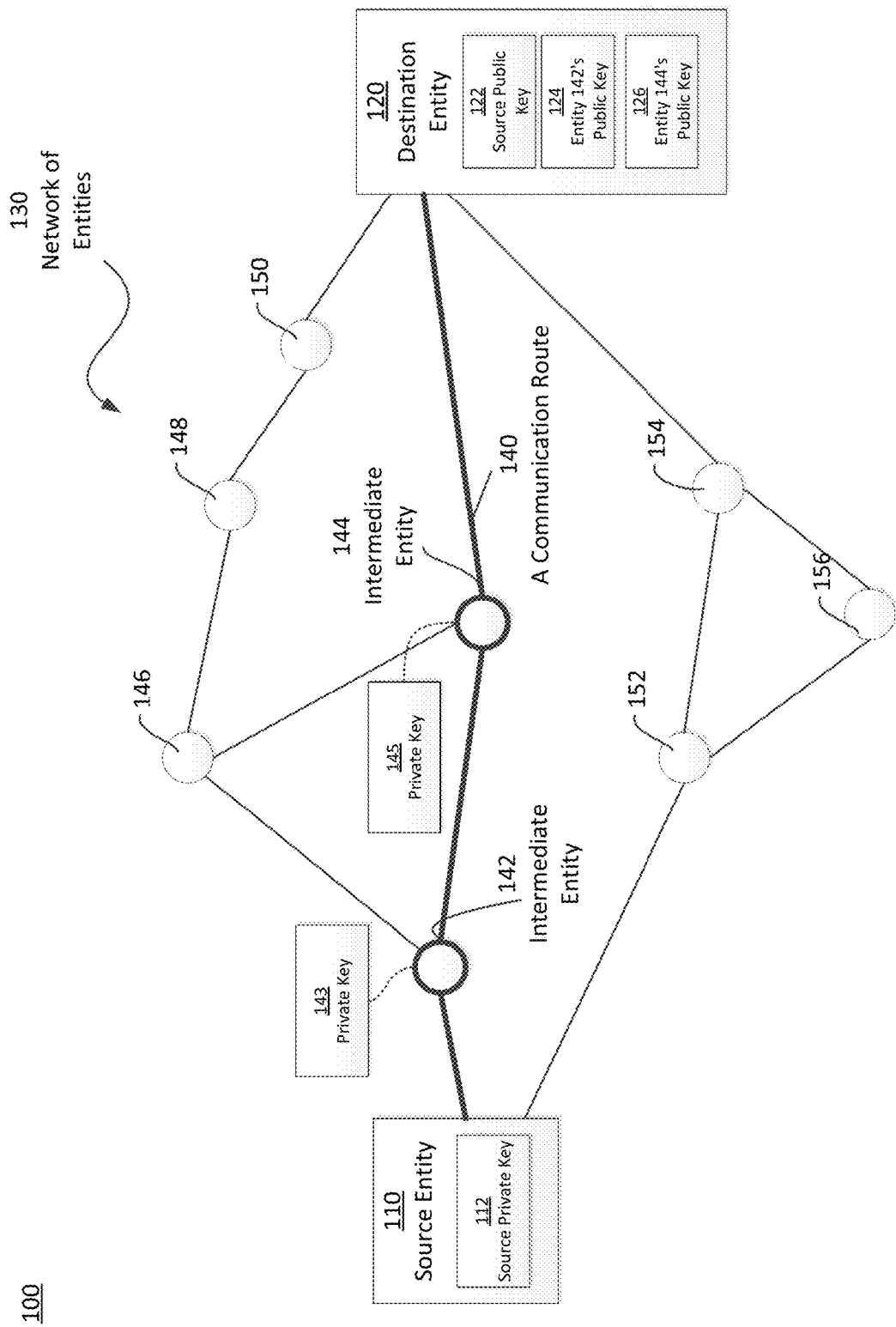
FIG. 1 illustrates an example of a communication system in accordance with the disclosed embodiments.

FIG. 1 illustrates an example of a communication system 100 in which concepts consistent with the principles of the invention may be implemented. As shown in FIG. 1, system 100 shows a network of entities 130 that includes a source entity 110, a destination entity 120, and intermediate entities 142-156.

An entity (e.g., source entity 110, destination entity 120, or an intermediate entity) may be any hardware or software capable of communicating via one or more network links represented by lines connecting the entities. For example, an entity may be a host device such as an internet-of-things device, laptop, tablet, cellular phone, server, or virtual machine. In another example, an entity may be a network device such as a gateway, router, switch, or hub. In some embodiments, an entity may be a service implemented on a cloud platform, such as Amazon Web Service, Google Cloud Service, and Microsoft Azure.

Network links may connect entities in network of entities 130 to each other. Two entities that are connected by a network link may communicate directly with each other. A network link may be a wired link or a wireless link. For example, a network link may be an Ethernet, Wi-Fi, Bluetooth, infrared, or fiber-optic link.

In system 100, source entity 110 may transmit communications that are destined for destination entity 120. Since source entity 110 is not directly connected to destination entity 120 by a network link in system 100, the communications may be delivered to destination entity 120 via a set of connected intermediate entities and network links connecting them (i.e., a communication route). As used herein, a communication route, or a route, refers to a set of connected entities that connect source entity 110 to destination entity 120. For example, as shown in FIG. 1, the communications transmitted by source entity 110 may be delivered to destination entity 120 via a communication route 140 that includes source entity 110, intermediate entity 142, intermediate entity 144, and destination entity 120.

Although not illustrated in FIG. 1, other routes between source entity 110 and destination entity 120 exist in system 100. For example, source entity 110 may be connected to destination entity 120 by a route that includes source entity 110, intermediate entity 152, intermediate entity 154, and destination entity 120; a route that includes source entity 110, intermediate entity 152, intermediate entity 156, intermediate entity 154, and destination entity 120; and a route that includes source entity 110, intermediate entity 142, intermediate entity 146, intermediate entity 148, intermediate entity 150, and destination entity 120.

In embodiments where multiple routes exist between source entity 110 and destination entity 120, the route taken by a communication may be selected in a number of ways. For example, a route may be selected from available routes based on the routes' performance, cost, and/or availability. In some embodiments, only a single route between source entity 110 and destination entity 120 may exist. In these embodiments, the only available route may be used for the communication between source entity 110 and destination entity 120.

In system 100 of FIG. 1, at least one intermediate entity on a communication route 140 may be capable of including additional data to the communication transmitted by source entity 110 and destined for destination entity 120. Thus, destination entity 120 may receive a communication that includes the original data transmitted by source entity 110 and additional data added by at least one intermediate entity on the route.

Moreover, at least some of the communications transmitted by source entity 110 destined for destination entity 120 may be route-verifiable communications. As used herein a "route-verifiable communication" may be a communication that includes information on the route taken by the communication (i.e., route information). In some embodiments, the route information may be used by intermediate entities and/or the final recipient of the communication (e.g., destination entity 120 and/or intermediate entities) to: (i) verify identities of at least a subset of the entities on the route taken by the communication, (ii) verify the identity of the source entity, and/or (iii) verify that the route taken by the communication includes an expected set of entities in an expected order. The route information may be included, generated, and/or updated by source entity 110 and at least a subset of entities on the route taken by the communication. The use of route-verifiable communications may significantly increase the difficulty and the complexity of the attack needed to spoof a communication in system 100. For example, instead of attacking a single entity (e.g., source entity 110), an attacker may need to attack every entity on route 140 to spoof a route-verifiable communication.

In system 100, public/private key pairs are generated for source entity 110 and for at least one entity on route 140 using a public-key cryptography algorithm, such as an RSA. The generated private keys may be kept within the entities associated with the private keys, but the corresponding public keys may be distributed throughout system 100 so that various entities may access them. FIG. 1 illustrates private and public keys that can be accessed by various entities in system 100. For example, as shown in FIG. 1, source entity 110, intermediate entity 142, and intermediate entity 144 have access to their own private keys 112, 143, and 145, respectively. Further, destination entity 120 may have access to source public key 122, intermediate entity 142's public key 124, and intermediate entity 144's public key 126.

While public/private key pairs have many different uses, in system 100, a private key may be used to generate a digital signature based on given data (i.e., to "sign the data"), and a corresponding public key (i.e., a public key that was generated with the private key using the public-key cryptography algorithm) may be used to verify that the generated digital signature is indeed generated by an entity that has access to the corresponding private key. Additionally, the corresponding public key may be used to further verify that the data has not been altered since the digital signature was generated.

In some embodiments, digital signatures of source entity 110 and/or at least one intermediate entity (e.g., entity 142) on the route taken by the communication (e.g., route 140) may be included in the route information. That is, the digital signatures of source entity 110 and/or at least one intermediate entity may be included in the communication, and the included digital signatures may be used by destination entity 110 to verify that the communication was delivered to destination entity 120 using route 140.

Figure 2:
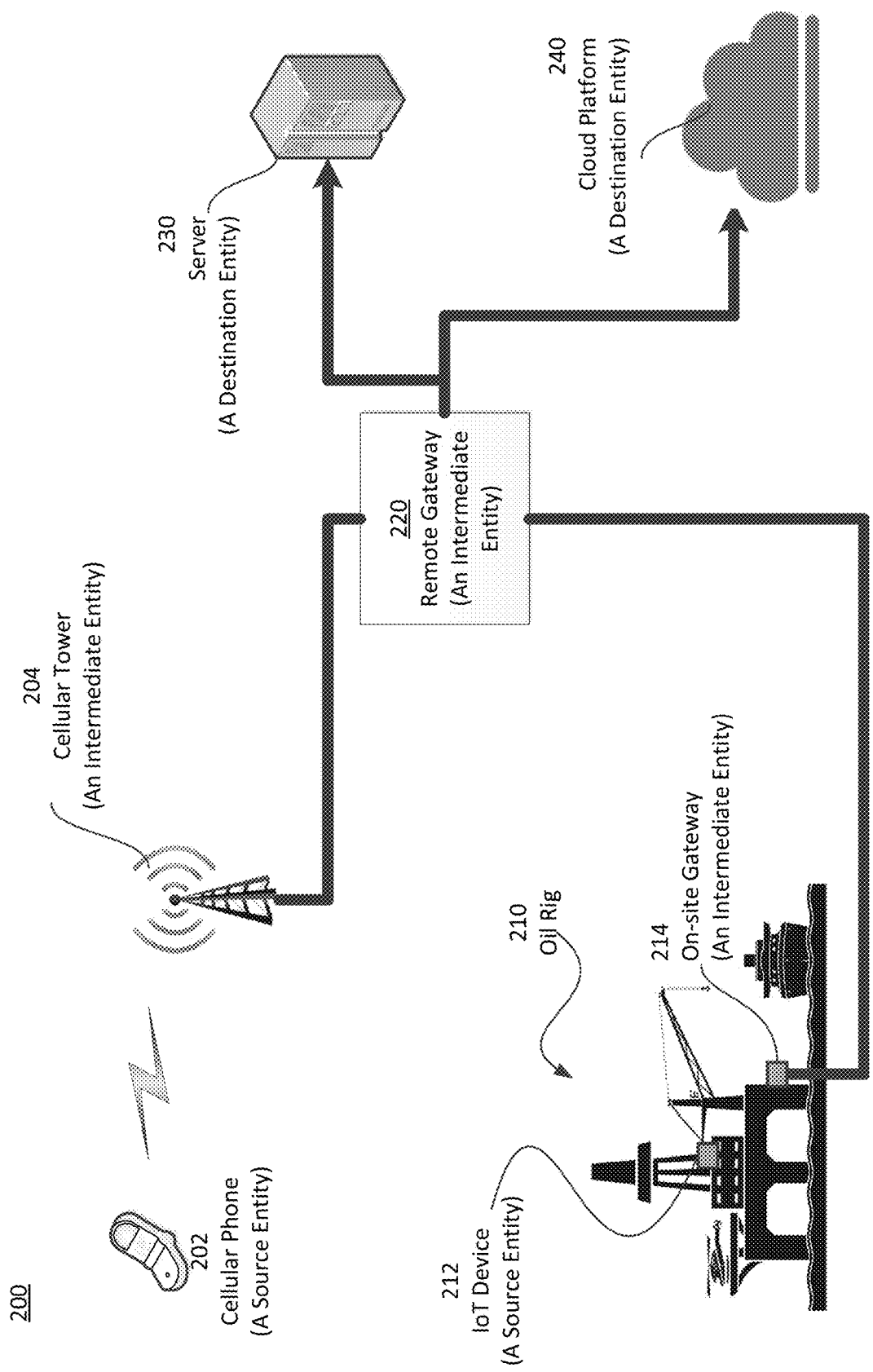
FIG. 2 illustrates another example of a communication system in accordance with the disclosed embodiments.

FIG. 2 illustrates an example of a system 200 in which additional concepts consistent with the principles of the invention may be implemented. System 200 is similar to system 100 of FIG. 1, except that system 200 illustrates various types of source entities, intermediate entities, and destination entities. For example, as shown in FIG. 2, source entities may include a cellular phone 202 and an internet-of-things device 212 deployed on an off-shore oil rig 210. Intermediate entities may include, for example, a cellular tower 204, an on-site gateway 214 deployed on oil rig 210, and a remote gateway 220. A destination entity may include, for example, a server 230 and a service implemented on a cloud platform 240.

Figure 3:
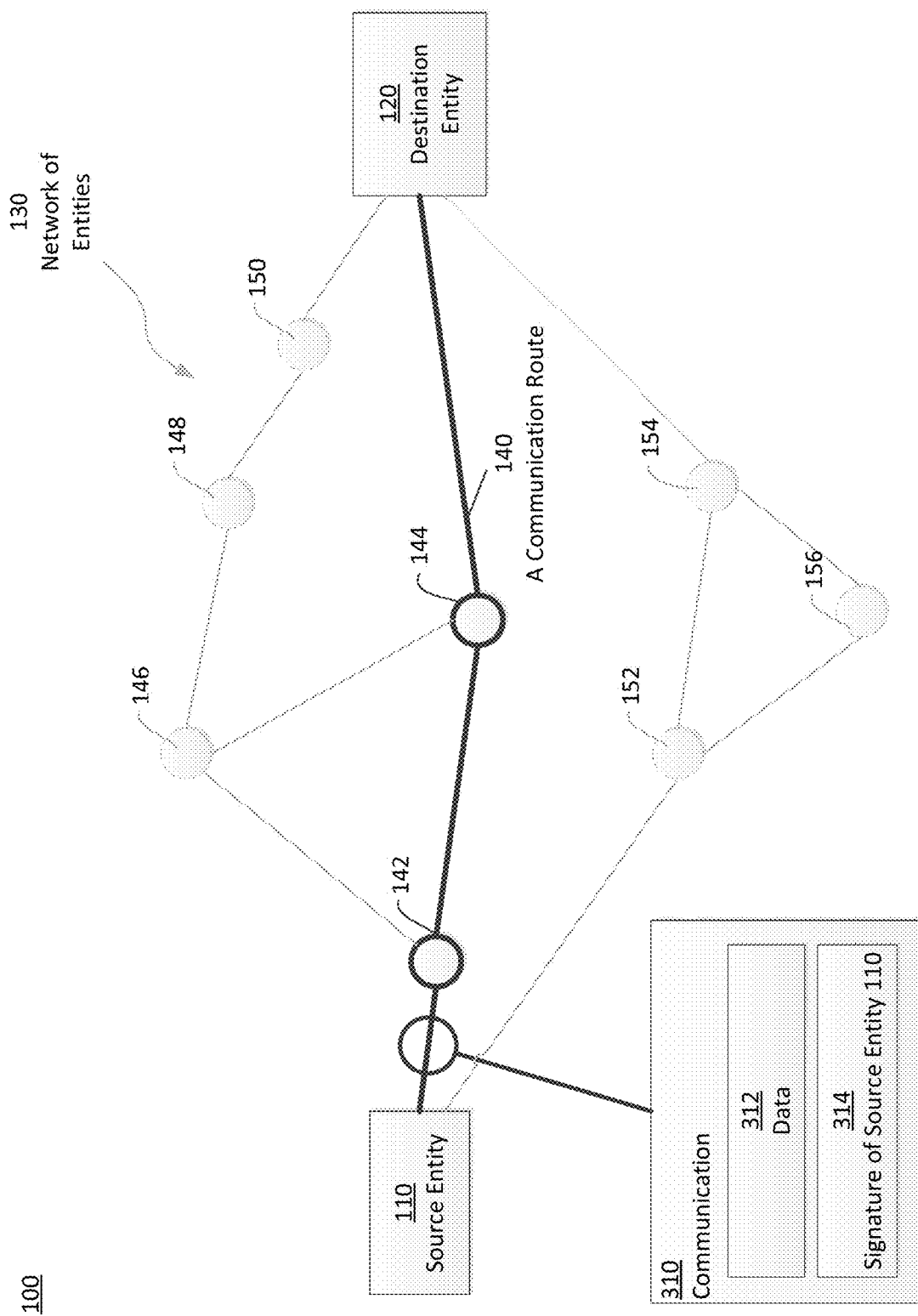
FIG. 3 illustrates the communication system of FIG. 1 after a communication destined for a destination entity is transmitted by a source entity.

FIG. 3 illustrates communication system 100 of FIG. 1 after a route-verifiable communication 310 destined for destination entity 120 is transmitted by source entity 110 and received at intermediate entity 142. As shown in FIG. 3, communication 310 is being delivered to destination entity 120 using route 140. Thus, communication 310 is transmitted by source entity 110 on a network link connecting source entity 110 to intermediate entity 142, which is the first intermediate node on route 140.

As shown in FIG. 3, communication 310 includes data 312 destined for destination entity 120 and a signature 314 associated with source entity 110. Data 312 may be any data that may be obtained by source entity 110 and destined for destination entity 120. For example, data 312 may include data from one or more components (e.g., sensors, user interfaces, receivers) included in, or otherwise accessible to, source entity 110. In another example, data 312 may include a request or an instruction destined for destination entity 120. In some embodiments, data 312 may be encrypted and/or obfuscated.

Signature 314 may be a digital signature generated at least based on data 312 using a private key associated with source entity 110 (i.e., source private key 112). A digital signature may be generated in numerous ways. In one example, a digital signature may be generated by encrypting a hash value of given data (e.g., data 312) using a private key (e.g., private key 112). In this example, a corresponding public key (e.g., public key 122) may be used to decrypt the digital signature and obtain the hash value of the original data. Thus, if the decrypted digital signature matches the hash value of the received data, it may prove that (i) the data was signed with a private key that corresponds to the public key, and (ii) the data has not changed since it was signed. However, if the decrypted digital signature does not match the hash value of the received data, the data has been altered and/or the digital signature was created with a private key that does not correspond to the public key. In some embodiments, a digital signature may be generated by encrypting metadata (e.g., checksum) of given data using a private key. In another example, a digital signature may also be generated by encrypting a portion or all of the given data using a private key. Here, a corresponding public key may be used to decrypt the digital signature to obtain the portion of, the data or the entire data. Subsequently, the decrypted digital signature may be compared to the received data to determine (i) that the data was signed with a private key that corresponds to the public key, and (ii) that the data has not changed since it was signed. It may be advantageous in terms of performance, however, to generate a digital signature based on a hash value rather than a portion or all of the given data because the size of a hash value is typically smaller than the size of the data. As used herein, the process of using a public key to prove that (i) the data was signed with a private key that corresponds to the public key, and (ii) the data has not changed since it was signed is referred to as "verifying the signature."

In system 100, signature 314 may have been obtained and included in communication 310 by source entity 110 before communication 310 was transmitted on the network link connecting source entity 110 with intermediate entity 142. In some embodiments, source entity 110 may have generated signature 314. Alternatively, source entity 110 may have caused generation of signature 314 and obtained the generated signature 314. For example, source entity 110 may have requested another entity with access to private key 112 to generate signature 314 and obtained the generated signature 314 from the entity. In some embodiments, private key 112 may be stored and/or signature 314 may be generated using a secure element (SE), trusted platform module (TPM), or a trusted execution environment (TEE).

In some embodiments, communication 310 may further include header data associated with signature 314. In these embodiments, signature 314 may be generated further based on the header data associated with signature 314. Thus, any changes to the header data after signature 314 is generated (i.e., after the header data is signed) may be detected during verification of signature 314. The header data associated with signature 314 may include any data available to source entity 110. In some embodiments, the header data associated with signature 314 may include a value indicative of an order in which signature 314 is generated and/or included in communication 310. For example, in the system of FIG. 3, the header data associated with signature 314 may include an index number (e.g., "0") to indicate that signature 314 is the first signature included in communication 310. In some embodiments, the header data associated with signature 314 may include data identifying source entity 110 and/or methods/algorithms used to generate signature 314.

Figure 4:
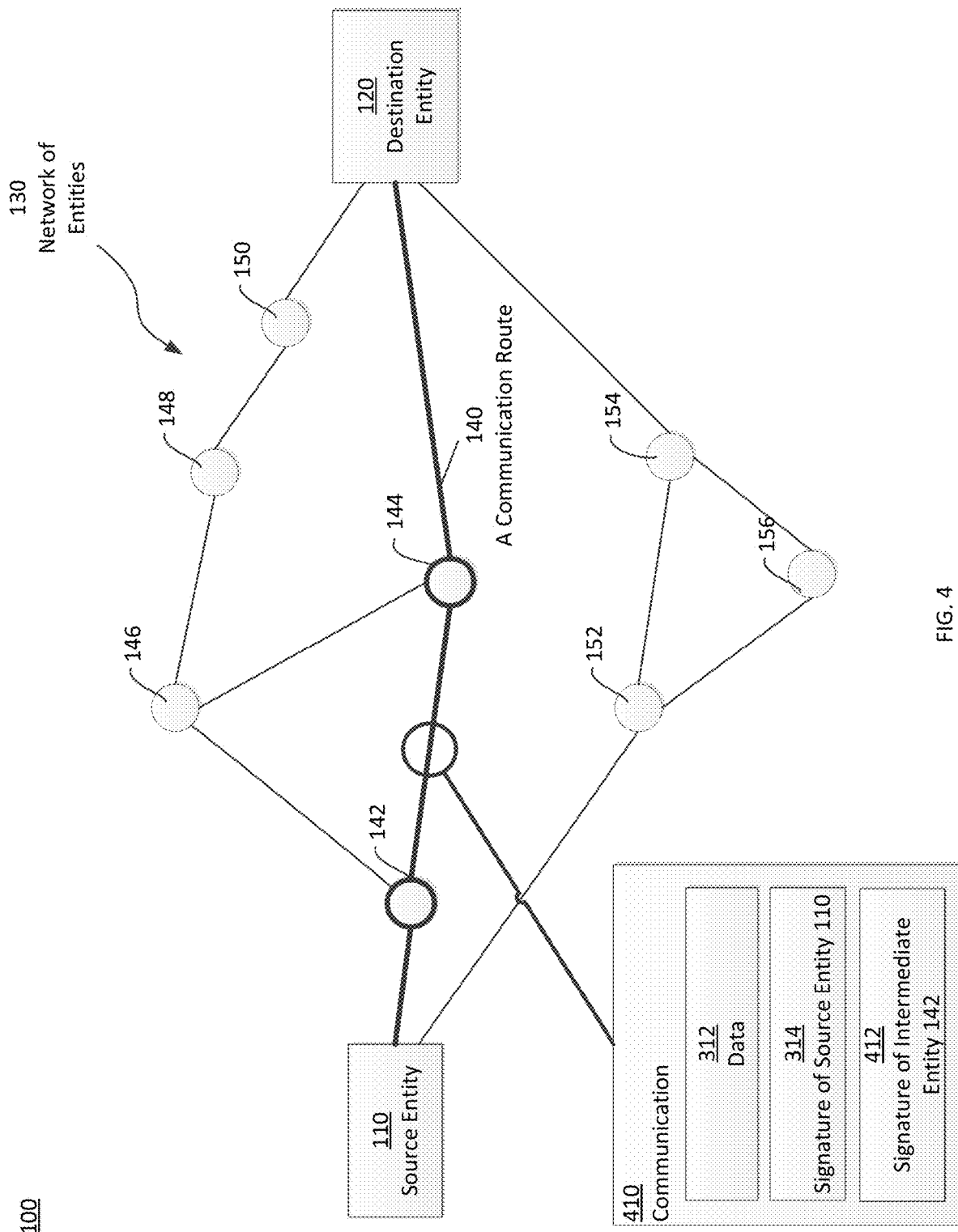
FIG. 4 illustrates the communication system of FIG. 3 after the communication is received and transmitted by an intermediate entity.

FIG. 4 illustrates system 100 of FIG. 3 after entity 142 receives communication 310 and transmits a route-verifiable communication 410. As discussed above, communication 410 is being delivered to destination entity 120 using route 140. Thus, communication 410 is transmitted by intermediate entity 142 on a network link connecting intermediate entity 142 to intermediate entity 144, which is the second intermediate node on route 140. Communication 410 is similar to communication 310 of FIG. 3 except that communication 410 further includes a signature 412 associated with intermediate entity 142.

Signature 412, similar to signature 314, may be a digital signature generated at least based on data 312 using a private key associated with intermediate entity 142 (i.e., private key 143). Thus, signature 412 may be used to prove that (i) the data was signed with private key 143, and (ii) the data has not changed since it was signed. In some embodiments, signature 412 may be generated further based on signature 314. In these embodiments, signature 412 may be used to prove that (i) data 312 and signature 314 was signed with private key 143, and (ii) data 312 and signature 314 have not changed since they were signed.

In system 100 of FIG. 4, signature 412 may have been obtained and included in communication 410 by intermediate entity 142 before communication 410 was transmitted on the network link connecting intermediate entity 142 with intermediate entity 144. In some embodiments, intermediate entity 142 may have generated signature 412. Alternatively intermediate entity 142 may have caused generation of signature 412 and obtained the generated signature 412. For example, intermediate entity 142 may have requested another entity with access to private key 143 to generate signature 412 and obtained the generated signature 412 from the entity. In some embodiments, private key 143 may be stored and/or signature 412 may be generated using a SE, TPM, or TEE.

In some embodiments, prior to obtaining and/or including signature 412 in communication 410 or prior to transmitting communication 410, intermediate entity 142 may have verified signature 314. For example, prior to generating signature 412, intermediate entity 142 may have verified using source public key 122 that signature 314 was indeed generated by source entity 110 and that data 312 has not been changed since it was signed by source entity 110. In these embodiments, intermediate entity 142 may have access to public keys that are associated with immediately neighboring entities that entity 142 is expected to receive communications from. For example, in system 100, entity 142 may have access to public keys associated with source entity 110, entity 144, and/or entity 146.

In some embodiments, the public keys may be stored on intermediate entity 142 or a data store accessible by intermediate entity 142. In some embodiments, the public keys may be stored on a shared data stores accessible by a plurality of entities (e.g., intermediate entity 142, intermediate entity 144, and/or destination entity 120).

In some embodiments, prior to obtaining and/or including signature 412 in communication 410 or prior to transmitting communication 410, intermediate entity 142 may verify that transmitting entity (e.g., source entity 110) is authorized to transmit communications via intermediate entity 142. For example, intermediate entity 142 may access a policy server and/or an authentication server to determine whether source entity 110 is authorized to transmit communications via entity 142. In another example, intermediate entity 142 may maintain, or have access to, a list of entities that are authorized and/or capable (e.g., physically connected to intermediate entity 142) of transmit communications via entity 142. In this example, intermediate entity 142 may verify that source entity 110 is included in such a list prior to obtaining and/or including signature 412 in communication 410 or prior to transmitting communication 410. In some embodiments, intermediate entity 142 may maintain, or have access to, a list of entities that are not allowed to communicate via entity 142. In these embodiments, intermediate entity 142 may verify that source entity 110 is not listed in such a list prior to obtaining and/or including signature 412 in communication 410 or prior to transmitting communication 410.

In some embodiments, communication 410 may further include header data associated with signature 412. In these embodiments, signature 412 may be generated further based on the header data associated with signature 412. Thus, any changes to the header data after signature 412 is generated (i.e., after the header data is signed) may be detected during verification of signature 412. The header data associated with signature 412 may include any data available to intermediate entity 142. In some embodiments, the header data associated with signature 412 may include a value indicative of order in which signature 412 is generated and/or included in communication 410. For example, in the system of FIG. 4, the header data associated with signature 412 may include an index number (e.g., "1") to indicate that signature 412 is the signature included in communication 410 after signature 314. In some embodiments, the header data associated with signature 412 may include data identifying intermediate entity 142 and/or methods/algorithms used to generate signature 412.

Figure 5:
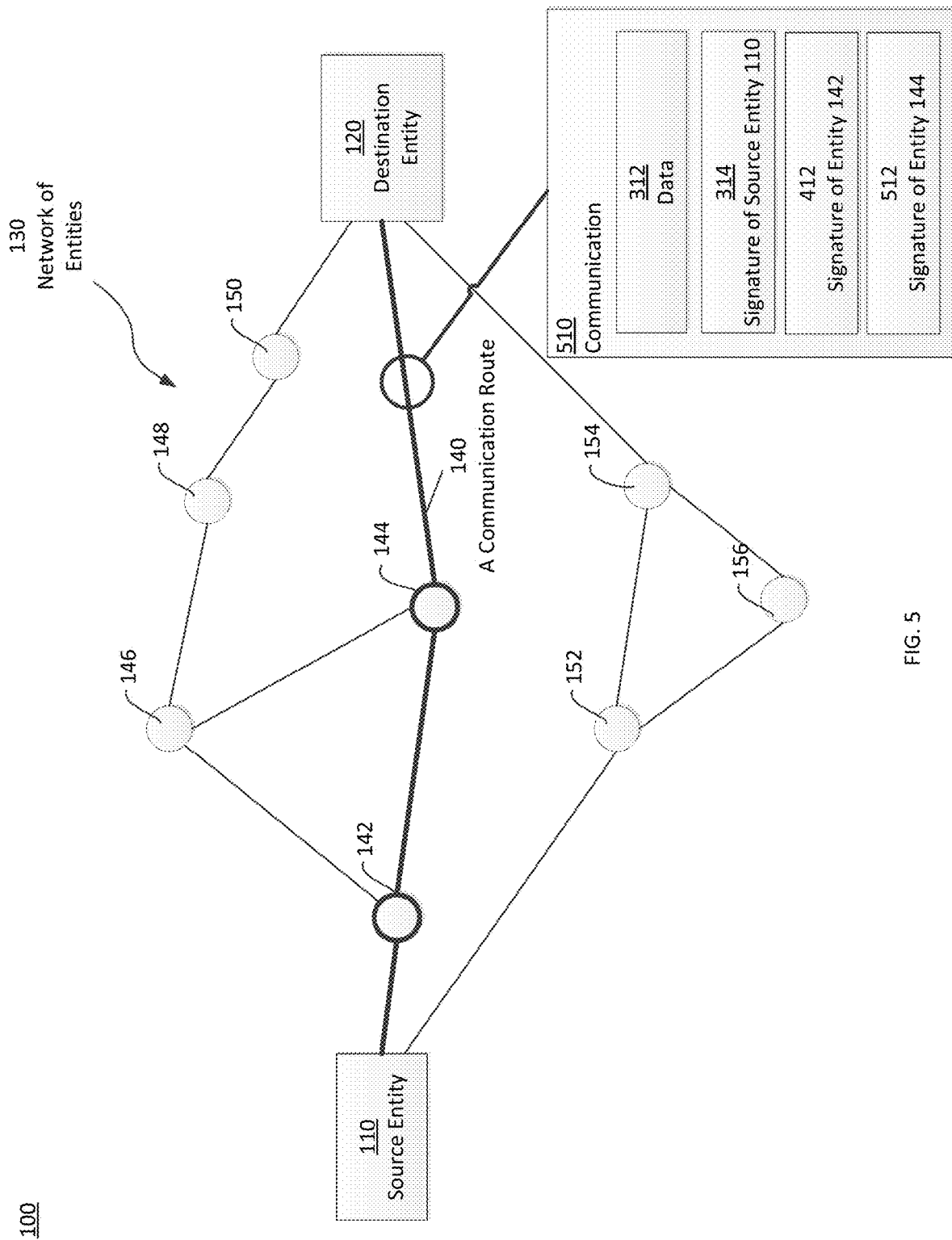
FIG. 5 illustrates the communication system of FIG. 4 after the communication is received and transmitted by another intermediate entity.

FIG. 5 illustrates system 100 of FIG. 4 after entity 144 receives communication 410 and transmits a route-verifiable communication 510. As discussed above, communication 510 is being delivered to destination entity 120 using route 140. Thus, communication 510 is transmitted by intermediate entity 144 on a network link connecting intermediate entity 144 to destination entity 120. Communication 510 is similar to communication 410 of FIG. 4 except that communication 510 further includes a signature 512 associated with intermediate entity 144.

Signature 512, similar to signature 412, may be a digital signature generated at least based on data 312 using a private key associated with intermediate entity 144 (i.e., private key 145). Thus, signature 512 may be used to prove that (i) the data was signed with private key 145, and (ii) the data has not changed since it was signed. In some embodiments, signature 512 may be generated further based on signature 314 and/or signature 412. In these embodiments, signature 512 may be used to prove that (i) data 312, signature 314, and/or signature 412 were signed with private key 145, and (ii) data 312, signature 314, and/or signature 412 have not changed since they were signed. In embodiments where communication 510 includes the header data associated with signature 314 and/or the header data associated with signature 412, signature 412 may be generated further based on the header data associated with signature 314 and/or the header data associated with signature 412.

In system 100 of FIG. 5, signature 412 may have been obtained and included in communication 510 by intermediate entity 144 before communication 510 was transmitted on the network link connecting intermediate entity 144 with destination entity 120. In some embodiments, intermediate entity 144 may have generated signature 512. Alternatively intermediate entity 144 may have caused generation of signature 512 and obtained the generated signature 512. For example, intermediate entity 144 may have requested another entity with access to private key 135 to generate signature 512 and obtained the generated signature 512 from the entity. In some embodiments, private key 145 may be stored and/or signature 512 may be generated using a SE, TPM, or TEE.

In some embodiments, prior to obtaining and/or including signature 512 in communication 510 or prior to transmitting communication 510, intermediate entity 144 may have verified one or more signatures previously included in communication 510. For example, intermediate entity 144 may verify the signature of an entity immediately before intermediate entity 144 on route 140 (i.e., signature 412). In this example, intermediate entity 144 may have access to public keys that are associated with immediately neighboring entities that entity 144 is expected to receive communications from. In another example, intermediate entity 144 may verify signatures of all intermediate entities preceding intermediate entity 144 on route 140 (i.e., signature 412). In yet another example, intermediate entity 144 may verify all entities preceding intermediate entity 144 on route 140 (i.e., signatures 314 and 412). In these examples, intermediate entity 144 may have access to public keys that are associated with all entities that entity 144 is expected to receive communications from.

In some embodiments, the public keys may be stored on intermediate entity 144 or a data store accessible by intermediate entity 144. In some embodiments, the public keys may be stored on a shared data stores accessible by a plurality of entities (e.g., intermediate entity 142, intermediate entity 144, and/or destination entity 120).

Similar to communication 410, in some embodiments, prior to obtaining and/or including signature 512 in communication 510 or prior to transmitting communication 510, intermediate entity 144 may verify that the transmitting entity (e.g., source entity 110) and/or one or more preceding intermediate entities (e.g., intermediate entity 142) are authorized to transmit communications via intermediate entity 144. For example, intermediate entity 144 may access a policy server and/or an authentication server to determine whether source entity 110 and/or intermediate entity 142 are authorized to transmit communications via entity 144. In another example, intermediate entity 144 may maintain, or have access to, a list of entities that are authorized and/or capable (e.g., physically connected to intermediate entity 144) of transmit communications via entity 144. In this example, intermediate entity 144 may verify that source entity 110 and/or intermediate entity 142 are included in such a list prior to obtaining and/or including signature 512 in communication 510 or prior to transmitting communication 510. In some embodiments, intermediate entity 144 may maintain, or have access to, a list of entities that are not allowed to communicate via entity 144. In these embodiments, intermediate entity 144 may verify that source entity 110 and/or intermediate entity 142 are not listed in such a list prior to obtaining and/or including signature 512 in communication 510 or prior to transmitting communication 510.

In some embodiments, the list(s) maintained by intermediate entity 144 may be synchronized with the list(s) maintained by other entities (e.g., intermediate entity 142). In some embodiments, the list(s) accessed by intermediate entity 144 may be the same as the list(s) accessed by other entities (e.g., intermediate entity 142). For example, the list(s) may be stored on a shared data store accessible by a plurality of entities.

In some embodiments, communication 510 may further include header data associated with signature 512. In these embodiments, signature 512 may be generated further based on header data associated with signature 512. Thus, any changes to the header data after signature 512 is generated (i.e., after the header data is signed) may be detected during verification of signature 512. The header data associated with signature 512 may include any data available to intermediate entity 144. In some embodiments, the header data associated with signature 512 may include data indicative of order at which signature 512 is generated and/or included in communication 510. For example, in the system of FIG. 5, the header data associated with signature 512 may include an index number (e.g., "2") to indicate that signature 512 is the signature included in communication 510 after signature 314 and signature 412. In some embodiments, the header data associated with signature 512 may include data identifying intermediate entity 144 and/or methods/algorithms used to generate signature 512.

Figure 6:
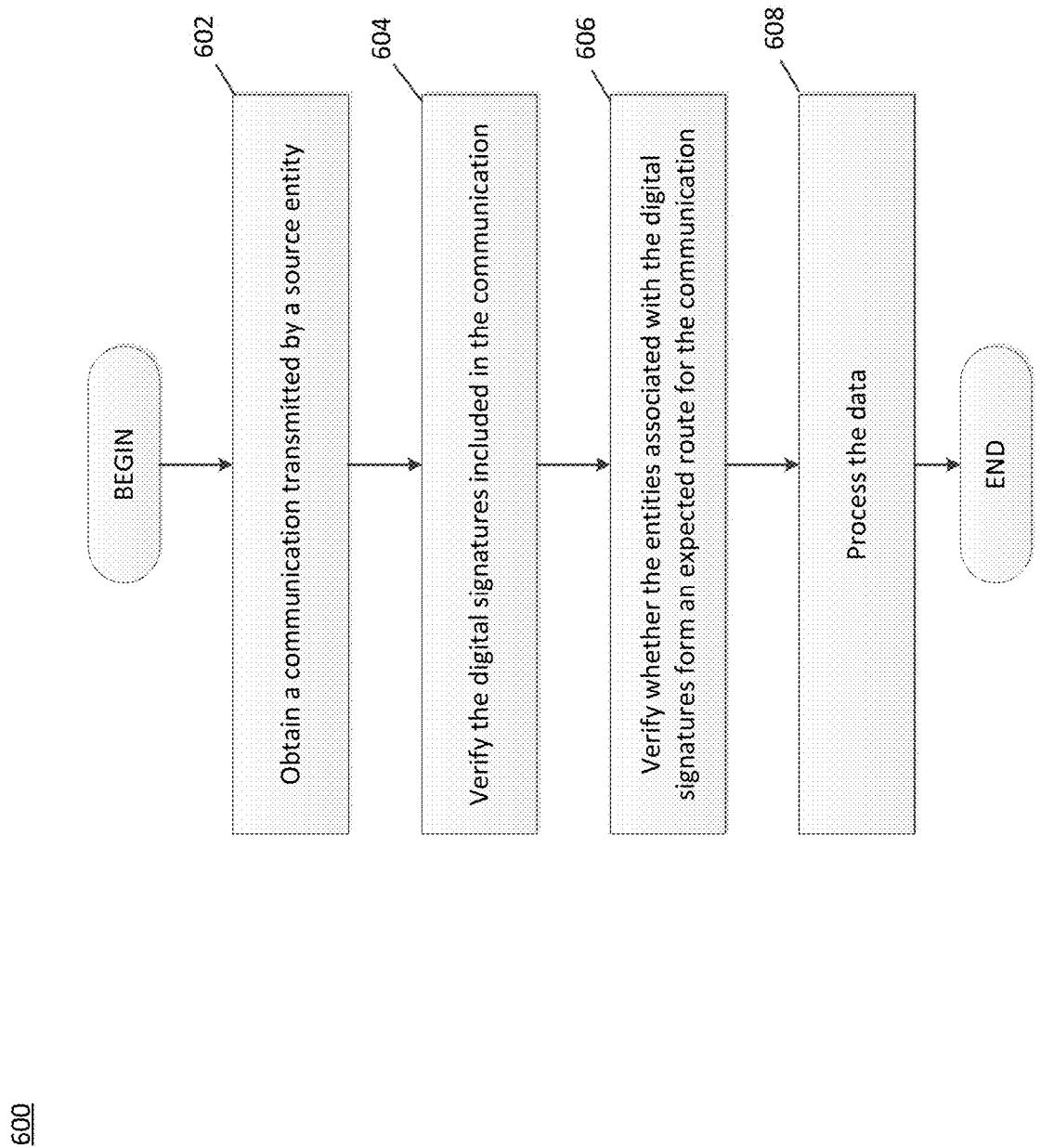
FIG. 6 illustrates a process for verifying a route taken by a communication in accordance with the disclosed embodiments.

FIG. 6 is an example of a process 600 performed or otherwise implemented by destination entity 120 after receiving route-verifiable communication 510. Process 600 may be capable of verifying the identities of the entities on the route taken by the communication and/or verifying that the route taken by the communication includes the expected set of entities in the expected order.

At step 602, destination entity 120 may obtain communication 510 transmitted by source entity 120. The communication may include data 312 and digital signatures. Each digital signature may be generated based on at least data 312. As discussed above, the digital signatures may include a digital signature associated with source entity 110 (e.g., signature 314), and a set of digital signatures associated with at least a subset of intermediate entities on route 140 taken by the communication (e.g., signatures 412 and/or 512). As discussed above, the digital signatures may have been obtained and/or included in communication 510 by the associated entities on route 140.

At step 604, destination entity 120 may verify the plurality of signatures included in communication 510. For example, destination entity 120 may verify signature 314, signature 412, and 512 included in communication 510. As discussed above, verifying a signature associated with an entity may include decrypting the signature using a public key associated with the entity and comparing the decrypted signature with a hash value or at least a portion of the signed data (e.g., data 312, signature 314, and/or signature 412). In some embodiments, destination entity 120 may verify the signatures of source entity 110 and the intermediate node immediately preceding destination entity 120 (i.e., intermediate entity 144). In an alternative step, destination entity 120 may verify the signature of the intermediate node immediately preceding destination entity 120.

In some embodiments, the public keys for verifying the signatures may be stored on destination entity 120 or a data store accessible by destination entity 120. In some embodiments, the public keys may be stored on a shared data stores accessible by a plurality of entities (e.g., intermediate entity 142, intermediate entity 144, and/or destination entity 120). In some embodiments, destination entity 120 may have access to all public keys of entities that can communicate with destination entity 120.

At a step 606, destination entity 120 may verify whether the entities associated with signatures included in communication 510 form an expected route for communication 510 transmitted by source entity 110. For example in system 100, destination entity 120 may expect that communications from source entity 110 to take route 140. Thus, destination entity 120 may verify that the entities associated with the signatures include intermediate entity 142 and intermediate entity 144. Destination entity 120 may further verify that a signature associated with source entity 110 is included in communication 510.

In some embodiments, destination entity 120 may determine the expected route for a communication based on a network map of system 100. The network map may include, for example, entities of system 100, network links connecting the entities, and/or costs/performance/availability associated with network links. In some embodiments, destination entity 120 may have access to a look-up table that includes expected routes corresponding to a source entity. The look-up table may be stored in destination entity 120 or on another entity/data store connected to destination entity 120, for example.

In some embodiments, destination entity 120 may further verify that the entities associated with signatures indicated as having been included in communication 510 in an expected order. For example, destination entity 120 may verify that signature associated with intermediate entity 142 is indicated as having been included before signature of intermediate entity 144. Destination entity 120 may further verify that signature associated with source entity 110 is indicated as having been included before signature of intermediate entity 142. As the indicators of the order in which the signatures are included in communication 510, destination entity 120 may use one or more values included in the headers data that may be associated with digital signatures. As discussed above, the header data may include, for example, a value indicative of the order in which the associated signature is included in communication 510.

If destination entity 120 determines that the entities associated with signatures included in communication 510 do not form the expected route for communication 510 transmitted by source entity 110, destination entity 120 may halt process 600. In some embodiments, communication 510 may be discarded if the entities associated with signatures included in communication 510 do not form the expected route. In some embodiments, communication 510 may be stored and/or transmitted for future examination (e.g., by an administrator) if the entities associated with signatures included in communication 510 do not form the expected route. In some embodiments, destination entity 120 transmit a communication destined for source entity 110, indicating that communication 510 was not accepted and/or processed by destination entity 120.

In some embodiments, destination entity 120 may verify that the transmitting entity (e.g., source entity 110) and/or one or more preceding intermediate entities (e.g., intermediate entity 142 and intermediate entity 144) are authorized to transmit communications destined for destination entity 120. For example, destination entity 120 may access a policy server and/or an authentication server to determine whether source entity 110, intermediate entity 142, and/or intermediate entity 144 are authorized to transmit communications destined for destination entity 120. In another example, and intermediate entity 144 may maintain, or have access to, a list of entities that are authorized and/or capable (e.g., physically connected to intermediate entity 144) of transmit communications destined for destination entity 120. In this example, destination entity 120 may verify that source entity 110, intermediate entity 142, and/or intermediate entity 144 are included in such a list. In some embodiments, destination entity 120 may maintain, or have access to, a list of entities that are not allowed to communicate with destination entity 120. In these embodiments, destination entity 120 may verify that source entity 110, intermediate entity 142, and/or intermediate entity 144 are not listed in such a list.

In some embodiments, the list(s) maintained by destination entity 120 may be synchronized with the list(s) maintained by other entities (e.g., intermediate entity 142 and/or intermediate entity 144). In some embodiments, the list(s) accessed by destination entity 120 may be the same as the list(s) accessed by other entities (e.g., intermediate entity 142 and/or intermediate entity 144). For example, the list(s) may be stored on a shared data store accessible by a plurality of entities.

At step 608, destination entity 120 may process data 312 included in communication 510. In some embodiments, destination entity 120 may begin processing data 312 prior to step 608 and finish processing data 312 at step 608. For example, destination entity 120 may finish processing the data after verifying the digital signatures and verifying that entities associated with the digital signatures included in communication 510 form the expected route for communication 510.

Figure 7:
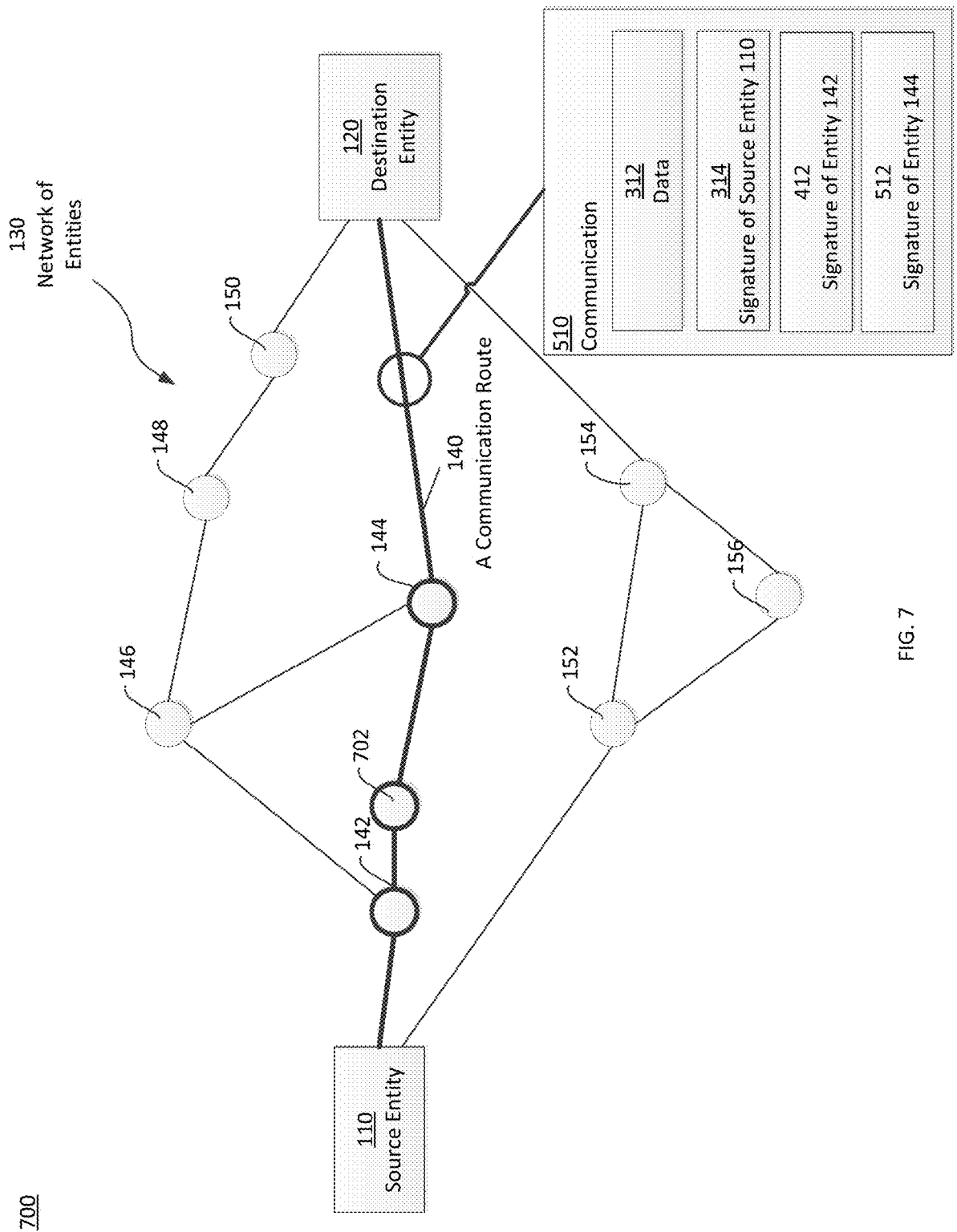
FIG. 7 illustrates another example of a communication system in accordance with the disclosed embodiments.

FIG. 7 illustrates another example of a communication system 700 in accordance with the disclosed embodiments. System 700 is similar to system 100 as shown in FIG. 5, except route 140 includes an additional intermediate entity 702. However, in contrast to other intermediate entities on route 140, intermediate entity 702 does not include its signature in communication 510. In some embodiments, intermediate entity 702 may be an entity incapable of modifying received communications. For example, intermediate entity 702 may be a hub or a layer-2 switch. In some embodiments, intermediate entity 702 may be an entity configured not to add its signature. In system 700, the routes expected by destination entity 120 may include only the intermediate entities that are known (e.g., based on a known network map of system 700 or based on a database that includes attributes of various nodes in system 700) to include their signatures in route-verifiable communications. Thus, in the example of FIG. 7, signatures of source entity 110, intermediate entity 142, and intermediate entity 144 are expected for route 140. In some embodiments, destination entity 120 may maintain, or have an access to, a list of intermediate entities known to include their signatures in route-verifiable communications.

FIG. 8 is an example of a JavaScript Object Notation Web Token (JWT)-based data structure 800 that can be used by communication system 100 for transmitting, signing, and receiving communication 510 in accordance with the disclosed embodiments. In some embodiments, the data structure 800 may be a JSON Web Signature (JWS) or a JSON Web Encryption (JWE) data structure.

Data structure 800, as shown in FIG. 8, includes a "payload" key-value pair and a "signatures" key-value pair. A value of the "payload" key-pair (i.e., <data>) may include data 312, and a value of the "signatures" key-pair may include an array of objects. Further, each object in the array of objects may include a "protected" key-value pair and a "signature" key-value pair. A value of the "protected" key-value pair may include a value indicative of an order in which the digital signatures are included in the communication. For example, as shown in FIG. 8, the value of the "protected" key includes a "sidx" key-value pair, whose value is a number indicative of the order in which the digital signatures are included in the communication. A value of the "signature" key-value pair (i.e., <signature X data>) may include a digital signature associated with a source entity or an entity on route 140 taken by communication 510. For example, the value of the "signature" key-value pair may include signature 314, signature 412, or signature 512.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A device for verifying a route taken by a communication, the device comprising:
one or more processors configured to:
obtain a communication transmitted by a source entity, wherein the communication comprises data and a set of digital signatures, wherein the set of digital signatures includes a digital signature associated with the source entity and one or more digital signatures respectively associated with at least a subset of intermediate entities on the route taken by the communication, and wherein the communication further comprises a header that specifies an order in which each signature of the set of digital signatures was included in the communication;
verify the digital signatures included in the communication;
verify that the digital signatures included in the communication were included in the communication in an expected order based at least in part on the header; and
process the data in response to verifying that the digital signatures were included in the expected order,
wherein the communication comprises a JSON Web Token (JWT) comprising a "payload" key-value pair, wherein a value of the "payload" key-value pair includes the data.

2. The device of claim 1, wherein the one or more processors are configured to process the data after verifying that the respective entities associated with the digital signatures included in the communication form an expected route for the communication.

3. The device of claim 1, wherein at least one digital signature of the set of digital signatures is generated further based on the digital signature associated with the source entity.

4. The device of claim 1, wherein a digital signature of the set of digital signatures is included in the communication by an intermediate entity on the route taken by the communication after the intermediate entity verifies at least one of the digital signatures included in the communication.

5. The device of claim 1, wherein the one or more processors are configured to process the data after verifying that one or more entities associated with the digital signatures included in the communication are authorized to communicate with the device.

6. The device of claim 1, wherein the data is encrypted.

7. The device of claim 1, wherein the JWT further comprises a "signatures" key-value pair, wherein a value of the "signatures" key-value pair includes an array of objects.

8. The device of claim 1, wherein each digital signature of the set of digital signatures is generated based at least in part on the data using a private key.

9. The device of claim 8, wherein each digital signature is generated by encrypting a hash value of the data using the private key.

10. A method for verifying a route taken by a communication, the method comprising:
obtaining a communication transmitted by a source entity, wherein the communication comprises data and a set of digital signatures, wherein the set of digital signatures includes a digital signature associated with the source entity and one or more digital signatures respectively associated with at least a subset of intermediate entities on the route taken by the communication, and wherein the communication further comprises a header that specifies an order in which each signature of the set of digital signatures was included in the communication;
verifying the digital signatures included in the communication;
verifying that the digital signatures included in the communication were included in the communication in an expected order based at least in part on the header; and
processing the data in response to verifying that the digital signatures were included in the expected order,
wherein the communication comprises a JSON Web Token (JWT) comprising a "payload" key-value pair, wherein a value of the "payload" key-value pair includes the data.

11. The method of claim 10, further comprising determining an expected route for the communication, and wherein the processing comprises processing the data after verifying that the respective entities associated with the digital signatures included in the communication form the expected route for the communication.

12. The method of claim 10, wherein a digital signature of the set of digital signatures is included in the communication by an intermediate entity on the route taken by the communication after the intermediate entity verifies at least one of the digital signatures included in the communication.

13. The method of claim 10, wherein the processing comprises processing the data after verifying that one or more entities associated with the digital signatures included in the communication are authorized to communicate with a device.

14. The method of claim 10, wherein the JWT further comprises a "signatures" key-value pair, wherein a value of the "signatures" key-value pair includes an array of objects.

15. The method of claim 10, wherein each digital signature of the set of digital signatures is generated based at least in part on the data using a private key.

16. The method of claim 15, wherein each digital signature is generated by encrypting a hash value of the data using the private key.

17. A non-transitory computer-readable storage medium storing instructions that when executed by a computer cause the computer to perform a method for verifying a route taken by a communication, the method comprising:
obtaining a communication transmitted by a source entity, wherein the communication comprises data and a set of digital signatures, wherein the set of digital signatures includes a digital signature associated with the source entity and one or more digital signatures respectively associated with at least a subset of intermediate entities on the route taken by the communication, and wherein the communication further comprises a header that specifies an order in which each signature of the set of digital signatures was included in the communication;
verifying the digital signatures included in the communication;
verifying that the digital signatures included in the communication were included in the communication in an expected order based at least in part on the header; and processing the data in response to verifying that the digital signatures were included in the expected order,
wherein the communication comprises a JSON Web Token (JWT) comprising a "payload" key-value pair, wherein a value of the "payload" key-value pair includes the data.

18. The non-transitory computer-readable storage medium of claim 17, wherein a digital signature of the set of digital signatures is included in the communication by an intermediate entity on the route taken by the communication after the intermediate entity verifies at least one of the digital signatures included in the communication.

19. The non-transitory computer-readable storage medium of claim 17, wherein the JWT further comprises a "signatures" key-value pair, wherein a value of the "signatures" key-value pair includes an array of objects.

* * * * *